United States Patent [19]

Davlin

[11] 4,403,795

[45] Sep. 13, 1983

[54] FLANGE UNION WITH IMPROVED RECESSED SEATS AND SEALING RING

[76] Inventor: Irwin H. Davlin, 714 S. Court St., Opelousas, La. 70570

[21] Appl. No.: 214,956

[22] Filed: Dec. 9, 1980

[51] Int. Cl.³ .......................................... F16L 27/06
[52] U.S. Cl. .................................. 285/184; 285/286; 285/334.2; 285/334.4; 285/351; 285/363; 285/416
[58] Field of Search ................. 285/334.2, 334.4, 184, 285/286, 363, 351, 416

[56] References Cited

U.S. PATENT DOCUMENTS

| 2,112,26 | 3/1938 | Brand | 285/363 |
|---|---|---|---|
| 816,155 | 3/1906 | Dean | 285/334.4 |
| 935,412 | 9/1909 | Rust | 285/184 X |
| 960,899 | 6/1910 | Guyer | 285/184 X |
| 969,422 | 9/1910 | Tanner et al. | 285/184 X |
| 1,475,867 | 11/1923 | Peterson | 285/184 |
| 1,807,003 | 5/1931 | Nelson | 285/334.2 |
| 2,340,732 | 2/1944 | Bruno | 285/334 L X |
| 3,567,258 | 3/1971 | Scaramucci | 285/334.4 |
| 3,752,509 | 8/1973 | Stafford | 285/DIG. 18 |
| 3,851,902 | 12/1974 | Robinson | 285/334.2 X |

FOREIGN PATENT DOCUMENTS

| 1119305 | 4/1956 | France | 285/368 |
|---|---|---|---|
| 1466193 | 12/1966 | France | 285/334.2 |
| 572,264 | 1/1958 | Italy | 285/334.4 |
| 221379 | 5/1942 | Switzerland | 285/184 |
| 292513 | 8/1953 | Switzerland | 285/334.2 |
| 294811 | 8/1928 | United Kingdom | 285/363 |
| 663946 | 5/1974 | U.S.S.R. | 285/184 |

Primary Examiner—Dave W. Arola
Attorney, Agent, or Firm—L. S. Van Landingham, Jr.

[57] ABSTRACT

A flange union is disclosed which is provided with opposed recessed female seats carried by the terminal inner ends of the flange members. A replacable sealing ring having an annular convex sealing surface is positioned between the annular cooperating sealing surfaces of the female seats. The configuration of the sealing surfaces is such that an annular metal-to-metal line seal of minimum surface area is formed closely adjacent the internal diameter of the bore. This results in the need for markedly less stress and strain on the flange bolts to achieve and maintain the sealing pressure. The flange union will seal effectively with the flange members being either in or out of alignment.

34 Claims, 9 Drawing Figures

FLANGE UNION WITH IMPROVED RECESSED SEATS AND SEALING RING

THE BACKGROUND OF THE INVENTION

1. The Field Of The Invention

The present invention relates to flange unions of the type adapted to join two conduits for fluids and thereby form a conduit joint therebetween. The invention is further concerned with conduit joints including the flange union described and claimed herein, and piping systems comprising one or more of the said flange unions and/or joints.

2. The Prior Art

Flange unions have been used extensively heretofore to detachably join the ends of the two conduits and thereby form a continuous length with a separable fluid tight seal or joint therebetween. The resultant structure provides for permanency of the installation when desired and also allows future changes and modifications to be made easily and without damaging or destroying the flange unions, the attached conduits, and/or other cooperating apparatus attached thereto. However, the prior art flange unions have a number of disadvantages and deficiencies which prevent them from being entirely satisfactory in all respects.

For example, one prior art flange union for joining conduits employs a gasket between the opposed terminal inner ends of a pair of flange members and a sealing pressure is applied thereto by means of a plurality of circumferentially spaced bolts. This flange union structure has a large annular sealing area which extends from the internal diameter of the bore outward to the bolts. The total force or pressure that must be exerted on a psi basis by tightening the flange bolts is very great due in part to the large surface area of the seal. Also, the average length of the moment arm that exists between the bolts and the points at which the sealing pressure is applied over the large sealing area is short and the mechanical advantage of the bolts is low. Inasmuch as the flange bolts are under constant stress due, among other reasons, to pressure surges in the conduits, vibration and outside forces applied to the conduits, they wear excessively fast and tend to develop stress cracks which ultimately cause mechanical failure. As a result, it is necessary to replace the bolts in prior art flange unions at frequent intervals. This is a time consuming and costly procedure which has the further disadvantage of lost production as the equipment must be taken off stream during the repairs.

The prior art flange unions described above are not self-aligning and thus are difficult to align properly under the installation conditions which exist on many jobs. They also have the disadvantage of not sealing properly when the flange members are mis-aligned initially, or when the flange members are knocked out of alignment during use. The above prior art flanges are not fire resistant and fail quickly in the event of a fire, they do not have a back-up secondary and/or tertiary seal which may be relied upon in the event of failure of the primary seal, no provision is made for replaceable inserts or other means to increase the life of the seal surfaces, and the seal surfaces are exposed and subject to damage prior to installation.

The aforementioned deficiencies and disadvantages of the prior art flange unions have been long recognized by those skilled in this art. However, an entirely satisfactory alternative thereto was not available prior to the present invention in spite of the long existing and great need therefor.

THE SUMMARY OF THE INVENTION

The present invention overcomes the aforementioned and other disadvantages and deficiencies of the prior art. This is accomplished by providing a flange union characterized by the novel and improved design described and claimed hereinafter.

The flange union of the invention may be provided with opposed recessed female seats carried by the terminal inner ends of the flange members. A replaceable sealing ring having an annular convex sealing surface is positioned between the annular cooperating sealing surfaces of the female seats. The sealing surfaces of the resultant assembly are urged into an effective sealing relationship by applying inwardly directed pressure to the opposed female seats, such as by tightening the nuts on flange bolts. The configuration of the sealing surfaces is such that an annular metal-to-metal line seal of minimum surface area is formed closely adjacent the internal diameter of the bore. Much less total pressure must be applied to the opposed female seats to achieve a desired pressure on the line sealing surfaces in terms of pounds per square inch. This results in the need for markedly less stress and strain on the flange bolts to achieve and maintain the sealing pressure. The flange union will seal effectively with the flange members being either in or out of alignment. The flange union is easy to install as the flange members are self-aligning when the sealing ring is in place. The recessed female seats also have configurations whereby the sealing surfaces are protected against damage prior to installation and are easy to keep clean in the field. The sealing ring may be replaced at low cost and greatly extends the effective life of the flange union.

THE BRIEF DESCRIPTION OF THE ACCOMPANYING DRAWINGS

The invention will be described hereinafter in greater particularity with reference to the presently preferred embodiments thereof illustrated in the accompanying drawings, wherein.

The aforementioned figures of the drawings are referred to and discussed below in the detailed description of the invention.

THE DETAILED DESCRIPTION OF THE INVENTION INCLUDING THE PRESENTLY PREFERRED EMBODIMENTS THEREOF

Figure 1:
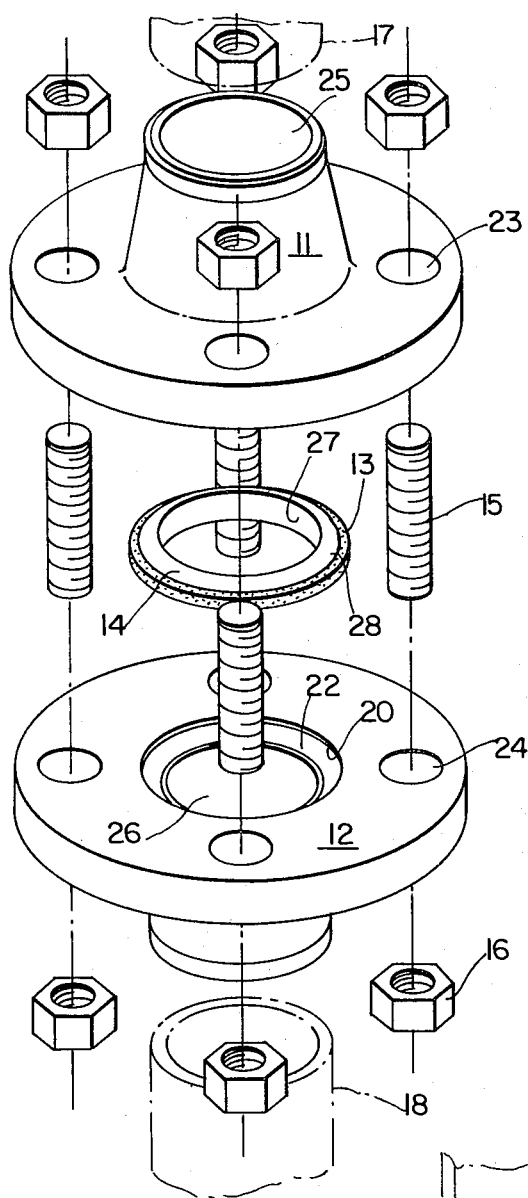
FIG. 1 is an exploded perspective view of the flange union of the invention and the two conduits to be joined thereby, the latter being shown in phantom line.
Figure 2:
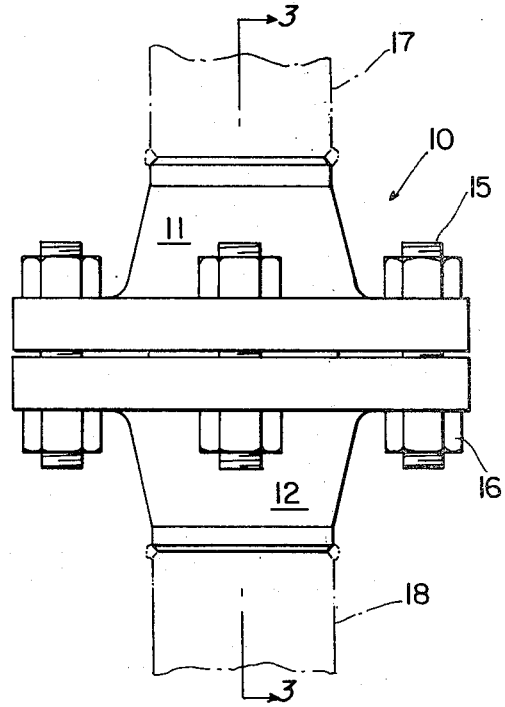
FIG. 2 is a side view in elevation of the assembled flange union of the invention and two conduits joined thereby, the latter being shown in phantom line.
Figure 3:
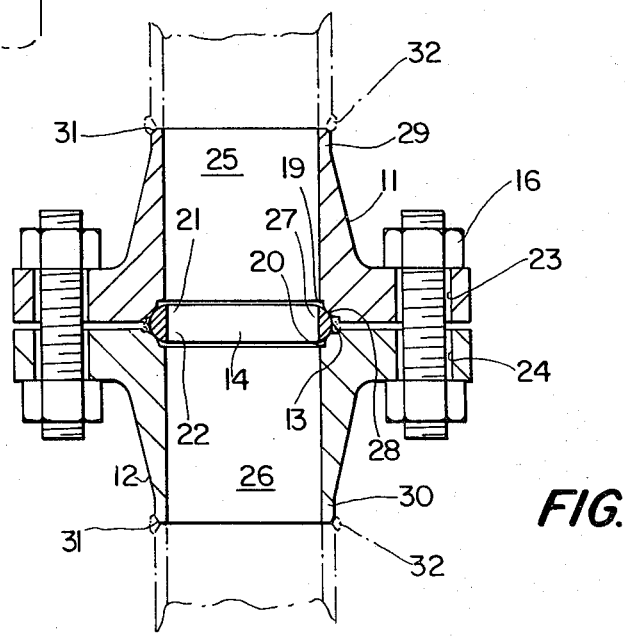
FIG. 3 is a longitudinal cross sectional view taken along the lines 3—3 of FIG. 2.
Figure 4:
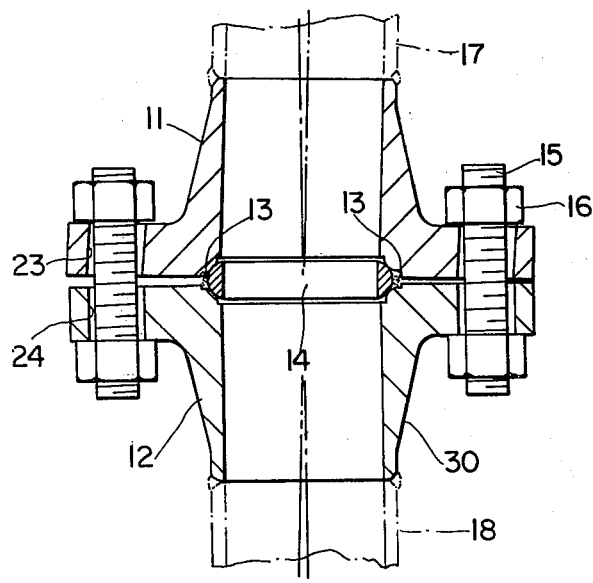
FIG. 4 is a longitudinal cross sectional view similar to FIG. 3, but further illustrating one of the flange members in a misaligned position.

Referring now to FIGS. 1-4 of the drawings, which illustrate one presently preferred embodiment of the invention, the flange union generally designated as 10 includes flange members 11 and 12, packing 13, sealing ring 14, threaded bolts 15 and nuts 16. The conduits 17 and 18 are illustrated in phantom line for purposes of clarity and simplification of the drawings. FIGS. 2, 3 and 4 of the drawings illustrate the flange union 10 of FIG. 1 in assembled form, and with the conduits 17 and 18 attached thereto to thereby form a fluid tight conduit joint.

The inner ends of flange members 11 and 12 are provided with annular recessed seats 19 and 20 which have convex sealing surfaces 21 and 22, respectively. The flange members 11 and 12 are provided with openings 23 and 24, respectively, which are spaced circumferentially at equal distances so as to be in alignment when properly positioned. The openings 23 and 24 have internal diameters which are substantially larger than the outside diameters of bolts 15, and the nuts 16 are sufficiently large so that they bridge over the openings 23 and 24 and extend outward therefrom a substantial distance. The bores 25 and 26 in flange members 11 and 12, respectively, and the opening 27 in sealing ring 14, have substantially the same internal diameters.

When the sealing ring 14 is properly positioned in the recessed seats 19 and 20, the convex surface 28 is in contact with the convex surfaces 21 and 22, and the internal surfaces of the bores 25 and 26 are substantially flush with the internal surface of opening 27. Upon applying sufficient pressure to the convex sealing surfaces 21, 22 and 28 by tightenging nuts 16 on bolts 15, a primary fluid tight annular metal-to-metal seal is formed. In addition thereto, the packing 13 is compressed and a secondary fluid-tight annular seal is formed externally of the outside diameter of ring 14. The outer ends 29 and 30 of flange members 11 and 12 may be joined to conduits 17 and 18, respectively, by any suitable conventional means such as by providing butt weld, socket weld, "slip on" or threaded fittings. In the embodiment illustrated in FIGS. 1-4, the ends 29 and 30 terminate in bevels 31 having a suitable configuration for butt welding conduits 17 and 18, respectively, thereto by means of welding beads 32.

Figure 5:
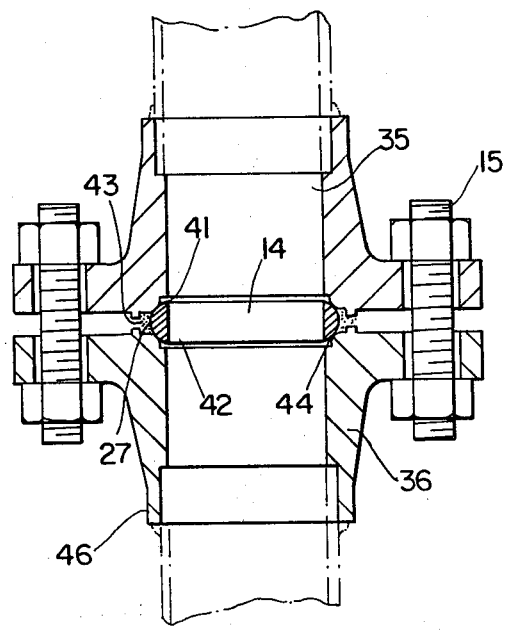
FIG. 5 is a longitudinal cross sectional view somewhat similar to FIG. 3, but further illustrating a modification thereof wherein opposed projections are provided outside of the recessed seat area, and the outer end portions of the flange members have socket weld means for attaching the conduits thereto.
Figure 6:
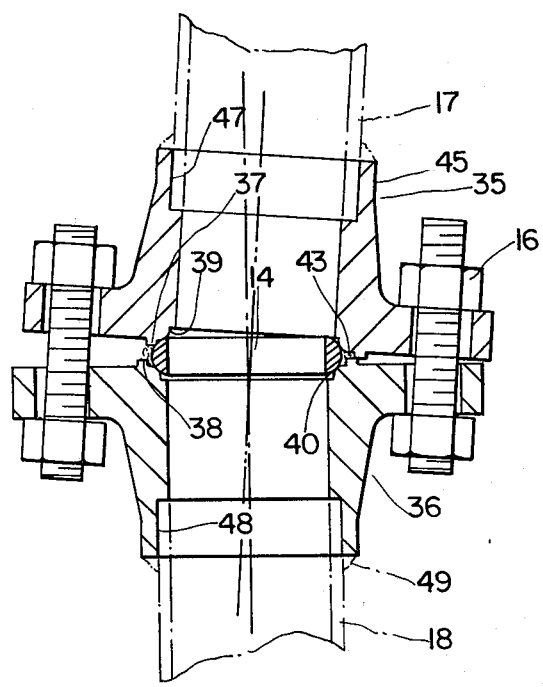
FIG. 6 is a view similar to FIG. 5, but further illustrating one of the flange members in a misaligned position.

FIGS. 5 and 6 illustrate a modification of the flange union of FIGS. 1-4. Referring now to FIGS. 5 and 6, the modified flange members 35 and 36 are provided with annular projections 37 and 38, respectively. The annular projections 37 and 38 are arranged outside of the recessed seats 39 and 40, which are provided with convex sealing surfaces 41 and 42, respectively. Annular packing 43 is provided between the surface 27 of sealing ring 14 and the projections 37 and 38, which are in opposed relationship and thus form an annular cavity 44 therebetween. The outer ends 45 and 46 of flange members 35 and 36 terminate in sockets 47 and 48 having internal diameters suitable for receiving conduits 17 and 18, respectively. The conduits 17 and 18 are inserted in sockets 47 and 48, respectively, and are welded thereto by welding beads 49. FIGS. 5 and 6 are otherwise the same as previously discussed for FIGS. 1-4, and reference may be made thereto in the interest of avoiding unnecessary repetition.

Figure 7:
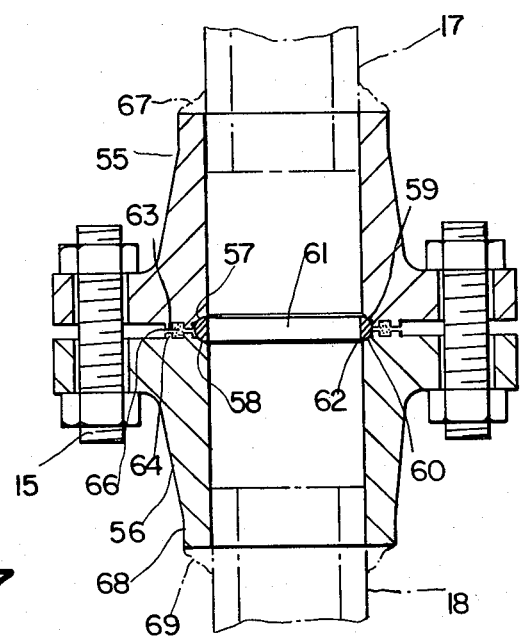
FIG. 7 is a longitudinal cross sectional view somewhat similar to FIG. 3, but further illustrating a modification thereof wherein the recessed seats of the flange members have flat sealing surfaces, and the members are adapted to provide a "slip-on" fitting for receiving the conduits joined thereby.

A further modification of the flange union of the invention is illustrated in FIG. 7. Referring now to FIG. 7, the inner ends of flange members 55 and 56 are provided with annular recessed seats 57 and 58 which have substantially straight sealing surfaces 59 and 60, respectively. When the sealing ring 61 is properly positioned in the recessed seats 57 and 58, the convex outer surface 62 thereof is in contact with the substantially straight surfaces 59 and 60. The inner ends of flange members 55 and 56 are also provided with annular areas 63 and 64, which are arranged in opposed relationship to thereby provide a cavity for receiving annular packing 66.

Upon applying sufficient pressure to the straight sealing surfaces 59 and 60 and the convex sealing surface 62 by tightening nuts 16 on bolts 15, a primary fluid tight annular metal-to-metal seal is formed therebetween. In addition thereto, the packing 66 is compressed and a secondary fluid tight annular seal is formed externally of the outside diameter of sealing ring 61. The outer ends 67 and 68 of flange members 55 and 56, respectively, are adapted to receive the outside diameters of conduits 17 and 18, and the conduits 17 and 18 are inserted in and welded thereto by means of welding beads 69. With the exception of the foregoing, the embodiment of FIG. 7 is as previously discussed for FIGS. 1-4, and reference may be had to the previous discussion in the interest of avoiding unnecessary repetition.

Figure 8:
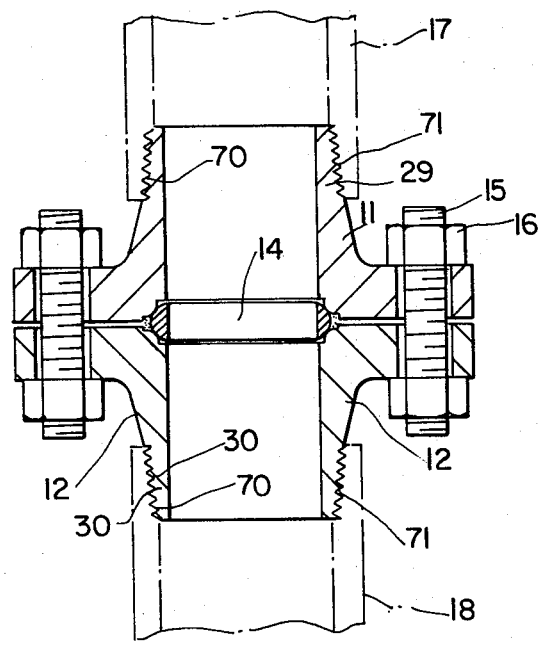
FIG. 8 is a view similar to FIG. 3, but with the terminal end portions of the flange members being modified to provide externally threaded ends for joining internally threaded conduits thereto.
Figure 9:
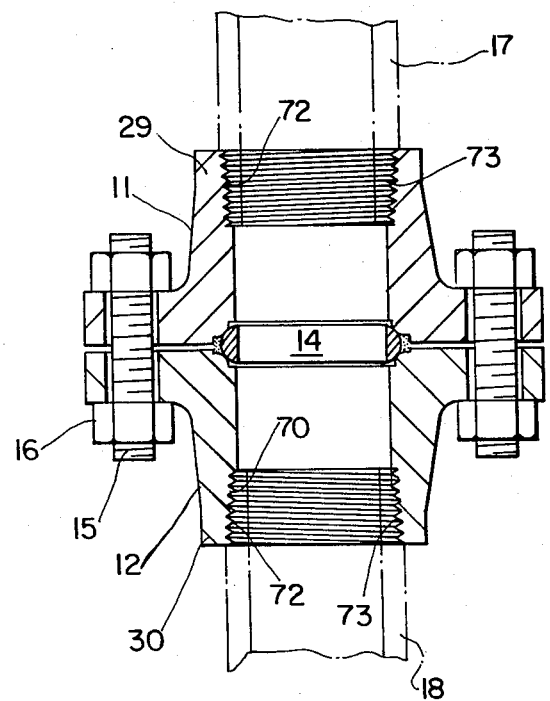
FIG. 9 is a view similar to FIG. 3, but with the terminal end portions of the flange members being modified to provide internally threaded ends for joining externally threaded conduits thereto.

FIGS. 8 and 9 illustrate further modifications of the embodiment illustrated in FIGS. 1-4. In the embodiment of FIG. 8, the outer end portions 28 and 29 have been modified to provide external threads 70, which receive the internal threads 71 on conduits 17 and 18, respectively, in threaded engagement. Similarly, in the embodiment illustrated in FIG. 9, the outer end portions 28 and 29 have been modified to provide internal threads 72 which are in threaded engagement with external threads 73 on conduits 17 and 18, respectively. The remainder of the embodiments illustrated in FIGS. 8 and 9 are as previously discussed for FIGS. 1-4 and reference may be had thereto in the interest of avoiding unnecessary repetition.

The flange union 10 is capable of sealing when the flange members 11 and 12, 35 and 36 and 55 and 56 are in either the aligned position illustrated in FIGS. 1-3, 5 and 7-9, or in a misaligned position as illustrated in FIGS. 4 and 6. This is an important feature of the present invention as the primary metal-to-metal seal may be maintained in the event that the flange union 10 is subjected to upsetting outside forces which result in misalignment. Referring now to FIG. 4, it may be noted that the flange members 11 and 12 are misaligned to a moderate degree. However, due to the openings 23 and 24 having substantially larger internal diameters than the outside diameters of bolts 15, there is sufficient unoccupied space for the bolts 15 to move relative to the center lines of the openings 23 and 24 without placing any substantially increased stress or strain thereon. Additionally, the sealing surfaces 21 and 22 are capable of moving relative to the convex surface 28 and an effective line seal is maintained therebetween as the flange members 11 and 12 are moved from the aligned position of FIG. 3 to the misaligned position of FIG. 4. The resilient seal 13 also remains effective in FIG. 4, and thus neither the primary metal-to-metal seal nor the secondary resilient seal is adversely affected by moderate misalignment. This feature is unique in the flange union art.

FIG. 5 illustrates a marked misalignment between the flange members 35 and 36, and it further illustrates the unique structure of the present invention which tends to prevent the primary metal-to-metal seal from being broken due to an excessive degree of misalignment. It may be noted that the flange members 35 and 36 are sufficiently out of alignment to cause the bolts 15 to begin to bind in the openings 23 and 24. This feature aids in preventing excessive misalignment in the embodiments illustrated in FIGS. 1-4 and 7-9. In the embodiment illustrated in FIGS. 5 and 6, the annular projections 37 and 38 have moved from their normally spaced positions illustrated in FIG. 5 to the contact positions illustrated in FIG. 6, thereby further aiding in preventing excessive misalignment which would break the primary metal-to-metal seal. The contact between the projections 37 and 38 occurs before the bolts 15 receive a substantial amount of additional stress or strain. This embodiment of the invention is especially important in instances where the conduit system is struck with sufficient force to cause the flange members 35 and 36 to misalign enough to break the primary metal-to-metal seal, or to cause the unprotected bolts 15 to break.

The configuration of the sealing surfaces 21, 22 and 28, 41, 42 and 28 and 59, 60 and 62 is such that an annular metal-to-metal line seal of minimum surface area is formed closely adjacent the internal diameter of the bore. As a result, the moment arm that exists between the bolts and the point at which the sealing pressure is applied approaches the maximum possible length, and in turn the mechanical advantage of the bolts approaches the maximum possible amount. Additionally, inasmuch as the configuration of the sealing surfaces is such that a fine line seal is achieved, the present invention simultaneously provides a minimum seal area. The maximization of the mechanical advantage of the flange bolts and minimization of the seal area permits a markedly lower total pressure to be applied to the recessed female seats 19 and 20, 39 and 40, and 57 and 58 to provide a desired pressure on the sealing surfaces in terms of pounds per square inch. This, in turn, results in markedly less stress and strain on the flange bolts when maintaining a given desired sealing pressure. Flange bolts having the substantially smaller outside diameters illustrated in the drawings may be used in the openings 23 and 24, thereby providing the additional room or play required for the misalignment feature discussed in connection with FIGS. 4 and 6.

Since the total force or pressure that must be exerted by tightening the flange bolts is much less in the present invention, the undersized bolts 15 are not too small when used with flange union 10. The increased mechanical advantage requires less strain on the bolts to maintain an effective sealing pressure when the flange union 10 is subjected to the constant stress characteristic of day to day operation, which is due, among other reasons, to pressure surges in the conduits, vibration, and outside forces applied to the conduits. The bolts 15 are thereby prevented from wearing excessively fast and they do not tend to develop stress cracks which would ultimately cause mechanical failure. It is not necessary to replace the bolts 15 at frequent intervals, as was true of the prior art flange unions, and this time consuming and costly procedure is avoided.

The flange union 10 is self aligning when the sealing ring 14 or 61 is properly positioned in place between the opposed recessed female seats. This is a further important advantage as flange union 10 may be aligned easily under the difficult installation conditions which exist on many jobs. Even if there is some misalignment initially, or the flange members are knocked out of alignment during use, the flange union 10 will still seal properly. In instances where a pair of conduits to be joined are not in proper alignment due to a construction error, often it is still possible to join the misaligned conduits. This is a further important advantage as it is not necessary to go to the expense of removing the faulty construction and then correct the error with new construction.

The sealing rings 14 and 61 are preferably constructed of a metal which is somewhat softer than the sealing surfaces with which it comes into contact. This allows the convex metal surface 28 or 62 to flow as necessary in making the metal-to-metal seal and the sealing surfaces of the female seats are not damaged and have a long life span. The inexpensive sealing ring 14 or 61 may be replaced at low cost as often as necessary, and thus it is an expendable item whereas the flange union 10 is costly.

When a fire resistant flange union 10 is not of importance, an annular resilient packing or seal 3, 43 or 66 may be employed as a secondary seal. When desired, two or more of such resilient seals having different diameters may be positioned around and outside of the primary metal seal. When fire resistance is of importance, then usually it is preferred to omit the resilient seal and retain only the metal-to-metal seal.

The provision of recessed female seats and sealing surfaces in the terminal inner ends of the flange members 11 and 12 is of importance as the seal and seat surfaces are protected against mechanical damage and contamination prior to installation. As is well known, the conditions existing in the field prior to and during installation are such that prior art flange unions are frequently damaged. Mechanical damage and/or contamination with undesirable foreign substances are substantially eliminated by the design of flange union 10.

The foregoing detailed discussion and the accompanying drawings are for purposes of illustration only, and are not intended as being limiting to the spirit or scope of the appended claims. It is understood that equivalent structures may be substituted for those specifically disclosed herein, and that equivalent materials of construction may be employed in addition to those specifically mentioned.

I claim:

1. A flange union consisting essentially of first and second integrally constructed cooperating flange members having inner and outer ends and alignable annular bores extending longitudinally therethrough which serve as a passageway for fluid, the said first and second flange members having first and second annular recessed female seats respectively formed in their terminal inner end surfaces and extending around the terminal inner ends of the said bores, the said first and second female seats including first and second cooperating annular sealing surfaces which likewise extend around the said terminal inner ends of the bores, the said first and second flange members being positioned whereby their respective bores are in communication and the terminal inner end surfaces thereof are opposite each other whereby the said first and second female seats and the said first and second cooperating sealing surfaces thereon are in opposed relationship, a sealing ring having an annular convex sealing surface positioned between the said female seats, the said annular convex sealing surface of the sealing ring having a diameter greater than the internal diameters of the said bores and being located outside of the said bores, the said sealing ring being positioned whereby the said annular convex sealing surface thereof is in continuous contact with the said first and second opposed cooperating annular sealing surfaces of the first and second female seats, the configuration of the said convex sealing surface on the sealing ring and the said first and second sealing surfaces on the first and second female seats being such that an annular line seal of minimized surface area is formed outside of and surrounding the internal diameters of the said bores but being closely adjacent thereto, means carried by the said first and second flange members which includes means formed integrally therewith for applying inwardly directed forces to the said first and second opposed female seats to thereby urge the said first and second opposed sealing surfaces thereof into an effective sealing relationship with the said convex annular surface on the sealing ring and thereby form annular seals around the said terminal inner ends of each of the said bores and provide a fluid tight passageway for fluid through the flange union, the said inner ends being normally spaced apart a distance whereby when the first and second flange members are aligned and the said first and second sealing surfaces are in an effective sealing relationship with the said convex surface on the sealing ring the first and second flange members may be moved in and out of alignment, and means carried by the said first and second flange members for allowing the first and second flange members to move in and out of alignment and for preventing them from moving sufficiently far out of alignment to break the said annular seals, the last named means including a set of cooperating annular opposed projections extending from the said terminal inner ends of the first and second flange members, the said set of projections being outside of the said convex sealing surface on the sealing ring and normally being spaced apart longitudinally when the first and second flange members are properly aligned, and the said set of projections being positioned and arranged whereby they come into contact when the said first and second flange members are out of alignment a predetermined amount whereby the said projections serve as a stop means which prevents the said seal from being broken.

2. The flange union of claim 1 wherein the said first and second sealing surfaces on the first and second female seats are convex in configuration whereby the resultant annular line seal around the said terminal inner ends of the bores is formed between opposed convex surfaces to thereby assure that the area of the line seal is minimized.

3. The flange union of claim 1 wherein the said terminal inner ends of the first and second flange members have two sets of cooperating annular opposed projections extending therefrom, the two sets of the said projections havig differing diameters and being concentrically arranged outside of the said convex sealing surface on the sealing ring whereby an annular space is formed therebetween, the two sets of the said projections normally being spaced apart longitudinally when the first and second flange members are properly aligned, the said projections being positioned and arranged whereby at least one set thereof comes into contact when the first and second flange members are out of alignment a predetermined amount and whereby the said projections serve as a stop means which prevents the said seal from being broken, and an annular resilient seal is positioned in the said annular space formed between the two sets of annular projections to thereby provide a secondary seal.

4. The flange union of claim 1 wherein the said set of cooperating opposed projections are annular projections concentrically arranged outside of the said convex sealing surface on the sealing ring whereby an annular space is formed therebetween.

5. The flange union of claim 4 wherein an annular resilient seal is positioned inside of the said annular opposed projections and outside of the said sealing ring to thereby provide a secondary seal.

6. The flange union of claim 1 wherein the said means for applying the inwardly directed forces to the said first and second opposed female seats is a plurality of threaded bolts and nuts mounted in aligned openings in the said first and second flange members and circumferentially around the bores thereof whereby the nuts on the threaded bolts may be tightened or loosened as necessary to provide a desired sealing pressure.

7. The flange union of claim 6 wherein the said aligned openings for the bolts have internal diameters substantially larger than the outside diameters of the bolts at the points adjacent thereto whereby the said first and second flange members may be moved in and out of alignment without breaking the said seal.

8. The flange union of claim 7 wherein the said aligned openings have internal diameters such that the outer surfaces of the bolts bind therein with continued movement out of alignment whereby the said first and second flange members are prevented from moving sufficiently far out of alignment to break the said seal in the event of failure of the said set of cooperating opposed projections.

9. The flange union of claim 1 wherein at least one annular resilient seal is positioned between the said terminal inner end surfaces of the flange members and outside of the said sealing ring to thereby provide a secondary seal.

10. The flange union of claim 1 wherein the said first and second flange members include means for attaching the said first and second outer ends thereof to first and second conduit means respectively to be joined by the said flange union.

11. The flange union of claim 10 wherein the said conduit attaching means includes a butt weld fitting.

12. The flange union of claim 10 wherein the said conduit attaching means includes a socket weld fitting.

13. The flange union of claim 10 wherein the said conduit attaching means includes male or female threads for receiving cooperating threaded ends of the said first and second conduit means in threaded relationship.

14. The flange union of claim 10 wherein the said conduit attaching means includes a slip-on fitting.

15. A conduit joint comprising a flange union and first and second conduit members, the said flange union consisting essentially of first and second integrally constructed cooperating flange members having inner and outer ends and alignable annular bores extending longitudinally therethrough which serve as a passageway for fluid, the said outer ends having conduit attaching means thereon connecting said conduits thereto, the said first and second flange members having first and second annular recessed female seats respectively formed in their terminal inner end surfaces and extending around the terminal inner ends of the said bores, the said first and second female seats including first and second cooperating annular sealing surfaces which likewise extend around the said terminal inner ends of the bores, the said first and second flange members being positioned whereby their respective bores are in communication and the terminal inner end surfaces thereof are opposite each other whereby the said first and second female seats and the said first and second cooperating sealing surfaces thereon are in opposed relationship, a sealing ring having an annular convex sealing surface positioned between the said female seats, the said annular convex sealing of the sealing ring having a diameter greater than the internal diameters of the said bores and being located outside of the said bores, the said sealing ring being positioned whereby the said annular convex sealing surface thereof is in continuous contact with the said first and second opposed cooperating annular sealing surfaces of the first and second female seats, the configuration of the said convex sealing surface on the sealing ring and the said first and second sealing surfaces on the first and second female seats being such that an annular line seal of minimized surface area is formed outside of and surrounding the internal diameters of the said bores but being closely adjacent thereto, means carried by the said first and second flange members which includes means formed integrally therewith for applying inwardly directed forces to the said first and second opposed female seats to thereby urge the said first and second opposed sealing surfaces thereof into an effective sealing relationship with the said convex annular surface on the sealing ring and thereby form annular seals around the said terminal inner ends of each of the said bores and provide a fluid tight passageway for fluid through the flange union, the said inner ends being normally spaced apart a distance whereby when the first and second flange members are aligned and the said first and second sealing surfaces are in an effective sealing relationship with the said convex surface on the sealing ring the first and second flange members may be moved in and out of alignment, and means carried by the said first and second flange members for allowing the first and second flange members to move in and out of alignment and for preventing them from moving sufficiently far out of alignment to break the said annular seals, the last named means including a set of cooperating annular opposed projections extending from the said terminal inner ends of the first and second flange members, the said set of projections being outside of the said convex sealing surface on the sealing ring and normally being spaced apart longitudinally when the first and second flange members are properly aligned, and the said set of projections being positioned and arranged whereby they come into contact when the said first and second flange members are out of alignment a predetermined amount whereby the said projections serve as a stop means which prevents the said seal from being broken, said first and second conduit members being attached in fluid tight relationship to the said first and second outer ends respectively of the flange union, and the interiors of the bores of the said flange members being in communication with the interiors of the said first and second conduit members whereby a continuous passageway for fluid is provided through the flange union.

16. The conduit joint of claim 15 wherein the said first and second sealing surfaces on the first and second female seats are convex in configuration whereby the resultant annular line seal around the said terminal inner ends of the bores is formed between opposed convex surfaces to thereby assure that the area of the line seal is minimized.

17. The conduit joint of claim 15 wherein the said means for applying the inwardly directed forces to the said first and second opposed female seats is a plurality of threaded bolts and nuts mounted in aligned openings in the said first and second flange members and circumferentially around the bores thereof whereby the nuts on the threaded bolts may be tightened or loosened as necessary to provide a desired sealing pressure.

18. The conduit joint of claim 15 wherein the said aligned openings for the bolts have internal diameters substantially larger than the outside diameters of the bolts at the points adjacent thereto whereby the said first and second flange members may be moved in and out of alignment without breaking the said seal.

19. The conduit joint of claim 15 wherein the said aligned openings have internal diameters such that the outer surfaces of the bolts bind therein with continued movement out of alignment whereby the said first and second flange members are prevented from moving sufficiently far out of alignment to break the said seal in the event of failure of said set of cooperating opposed projections.

20. The conduit joint of claim 15 wherein the said conduit attaching means includes a butt weld fitting.

21. The conduit joint of claim 15 wherein the said conduit attaching means includes a socket weld fitting.

22. The conduit joint of claim 15 wherein the said conduit attaching means includes male or female threads for receiving cooperating threaded ends of the said first and second conduit means in threaded relationship.

23. The conduit joint of claim 15 wherein the said conduit attaching means includes a slip-on fitting.

24. A conduit system for transporting fluids comprising a plurality of interconnected conduit and a flange union, the said flange union being installed in the said conduit system as a component thereof and with the interior of the bore of the said flange union thereof being in communication with the interior of at least one of the said conduits and conduit attaching means on said union connecting at least one of said conduits thereto, the said flange union consisting essentially of first and second integrally constructed cooperating flange members having inner and outer ends and alignable annular bores extending longitudinally therethrough which serve as a passageway for fluid, the said first and second flage members having first and second annular recessed female seats respectively formed in their terminal inner end surfaces and extending around the terminal inner ends of the said bores, the said first and second female seats including first and second cooperating annular sealing surfaces which likewise extend around the said terminal inner ends of the bores, the said first and second flange members being positioned whereby their respective bores are in communication and the terminal inner end surfaces thereof are opposite each other whereby the said first and second female seats and the said first and second cooperating sealing surfaces thereon are in opposed relationship, a sealing ring having an annular convex sealing surface positioned between the said female seats, the said annular convex sealing surface of the sealing ring having a diameter greater than the internal diameters of the said bores and being located outside of the said bores, the said sealing ring being positioned whereby the said annular convex sealing surface thereof is in continuous contact with the said first and second opposed cooperating annular sealing surfaces of the first and second female seats, the configuration of the said convex sealing surface on the sealing ring and the said first and second sealing surfaces on the first and second female seats being such that an annular line seal of minimized surface area is formed outside of and surrounding the internal diameters of the said bores but being closely adjacent thereto, means carried by the said first and second flange members which includes means formed integrally therewith for applying inwardly directed forces to the said first and second opposed female seats to thereby urge the said first and second opposed sealing surfaces thereof into an effective sealing relationship with the said convex annular surface of the sealing ring and thereby form annular seals around the said terminal inner ends of each of the said bores and provide a fluid tight passageway for fluid through the flange union, the said inner ends being normally spaced apart a distance whereby when the first and second flange members are aligned and the said first and second sealing surfaces are in an effective sealing relationship with the said convex surface on the sealing ring the first and second flange members may be moved in and out of alignment, and means carried by the said first and second flange members for allowing the first and second flange members to move in and out of alignment and for preventing them from moving sufficiently far out of alignment to break the said annular seals, the last named means including a set of cooperating annular opposed projections extending from the said terminal inner ends of the first and second flange members, the said set of projections being outside of the said convex sealing surface on the sealing ring and normally being spaced apart longitudinally when the first and second flange members are properly aligned, and the said set of projections being positioned and arranged whereby they come into contact when the said first and second flange members are out of alignment a predetermined amount whereby the said projections serve as a stop means which prevents the said seal from being broken.

25. A conduit system for transporting fluids in accordance with claim 24 wherein the said first and second sealing surfaces on the first and second female seats are convex in configuration whereby the resultant annular line seal around the said terminal inner ends of the bores is formed between opposed convex surfaces to thereby assure that the area of the line seal is minimized.

26. A conduit system for transporting fluids in accordance with claim 24 wherein the said means for applying the inwardly directed forces to the said first and second opposed female seats is a plurality of threaded bolts and nuts mounted in aligned openings in the said first and second flange members and circumferentially around the bores thereof whereby the nuts on the threaded bolts may be tightened or loosened as necessary to provide a desired sealing pressure.

27. A conduit system for transporting fluids in accordance with claim 26 wherein the said aligned openings for the bolts have internal diameters substantially larger than the outside diameters of the bolts at the point adjacent thereto whereby the said first and second flange members may be moved in and out of alignment without breaking the said seal.

28. A conduit system for transporting fluids in accordance with claim 26 wherein the said aligned openings have internal diameters such that the outer surfaces of the bolts bind therein with continued movement out of alignment whereby the said first and second flange members are prevented from moving sufficiently far out of alignment to break the said seal in the event of failure of the said set of cooperating opposed projections.

29. A conduit system for transporting fluids in accordance with claim 24 wherein the said set of cooperating opposed projections are annular projections concentrically arranged outside of the said convex sealing surface on the sealing ring whereby an annular space is formed therebetween, and an annular resilient seal is positioned in the said annular space to thereby provide a secondary seal.

30. A conduit system for transporting fluids in accordance with claim 24 wherein at least one annular resilient seal is positioned between the said terminal inner end surfaces of the flange members and outside of the said sealing ring to thereby provide a secondary seal.

31. A conduit system for transporting fluids in accordance with claim 24 wherein the said conduit attaching means includes a butt weld fitting.

32. A conduit system for transporting fluids in accordance with claim 24 wherein the said conduit attaching means includes a socket weld fitting.

33. A conduit system for transporting fluids in accordance with claim 24 wherein the said conduit attaching means includes male or female threads for receiving cooperating threaded ends of the said first and second conduit means in threaded relationship.

34. A conduit system for transporting fluids in accordance with claim 24 wherein the said conduit attaching means includes a slip-on fitting.

* * * * *